Figure 1:
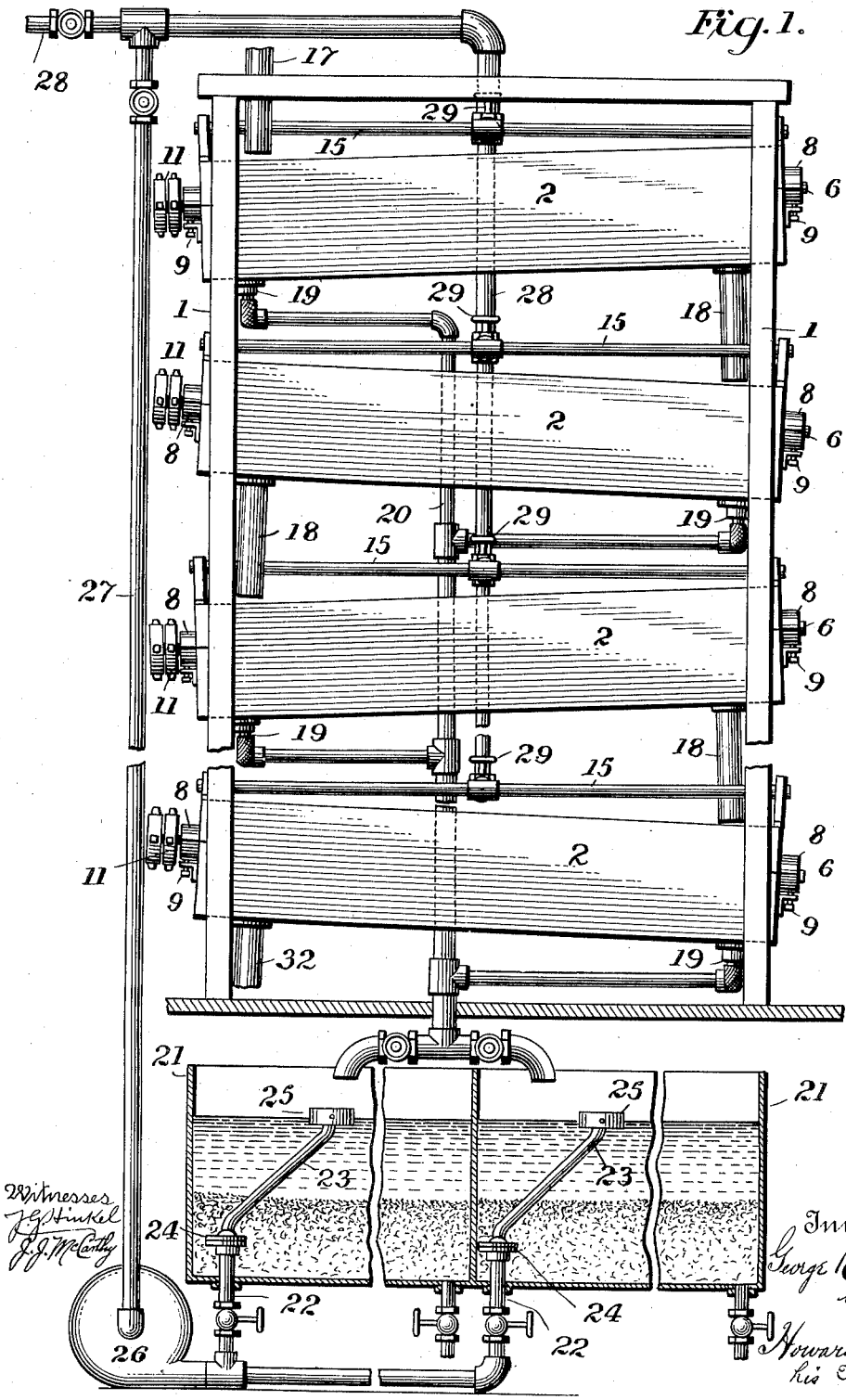

G. R. SHERWOOD.
SEPARATOR.
APPLICATION FILED AUG. 21, 1908.

927,885.

Patented July 13, 1909.
2 SHEETS—SHEET 1.

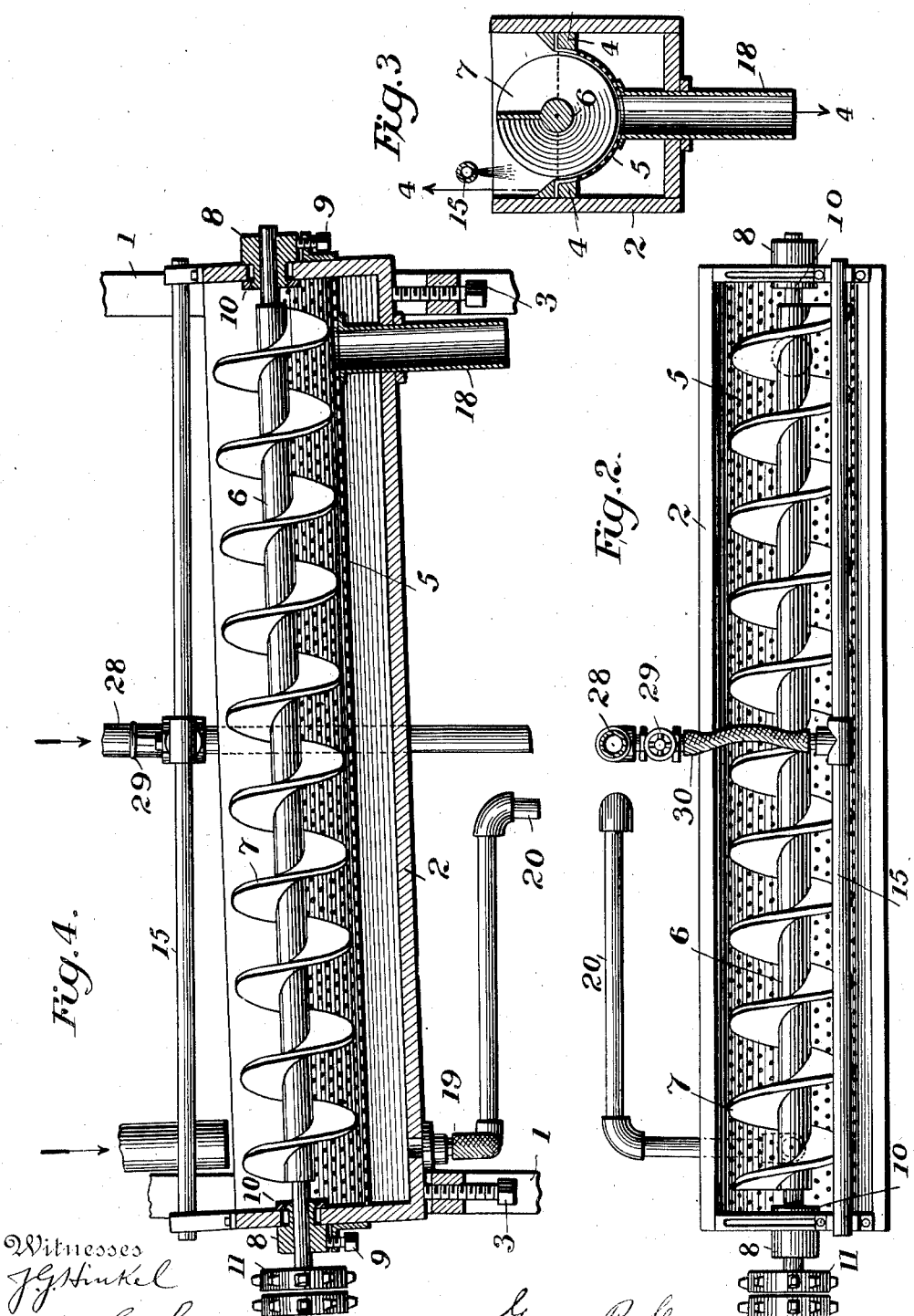

UNITED STATES PATENT OFFICE.

GEORGE R. SHERWOOD, OF OAK PARK, ILLINOIS.

SEPARATOR.

No. 927,885.     Specification of Letters Patent.     Patented July 13, 1909.

Application filed August 21, 1908. Serial No. 449,681.

*To all whom it may concern:*

Be it known that I, GEORGE R. SHERWOOD, a citizen of the United States, residing at Oak Park, in the county of Cook and State of Illinois, have invented certain new and useful Improvements in Separators, of which the following is a specification.

My invention appertains to the art of making paper from the fibrous portions of plants, and consists more particularly in a screen for separating the different cellular elements composing the vegetative parts of plants, especially those plants that belong to the grass, sedge, and rush families; including Indian corn, or maize, Kafir corn, milo maize, Jerusalem corn, and other saccharine and non-saccharine species and their varieties, of the genus sorghum, also sugar cane, especially after the juice has been expressed, bamboos, canes, tules, papyrus and other plants.

The cellular elements in the plants referred to comprise relatively long, thin fibers and relatively small pith cells. After the food substances and other volatile constituents have been extracted from these cellular elements, it has been found that they are unfit for the manufacture of paper unless the fibers are separated from the pith cells and it has hitherto proved impracticable to accomplish this on a commercial scale. However, by the use of the apparatus hereinafter described, the difficulties previously encountered in attempting the said separation are overcome, the fibers are recovered entirely free from the cells in a reasonable time, and the operation can be carried on continuously.

The separation is accomplished in a purely mechanical manner; the mixed cells and fibers, as they come from the digester, are introduced at the top of the apparatus, are separated in their passage through the same and are collected separately at the bottom.

From the long fibers an excellent quality of soft writing or book paper can be made, and from the pith cells a superior parchment can be produced by the addition of suitable substances.

One form of the apparatus is shown by way of example in the accompanying drawings, in which—

Figure 1 is a broken side view of the complete apparatus, Fig. 2 is a plan view on a larger scale of one of the troughs, Fig. 3 is a cross-sectional view, and Fig. 4 is a sectional view of the same taken on the line 4—4 of Fig. 3.

The apparatus consists of a frame-work 1 in which are supported, one above the other, and alternately inclined in opposite directions, the troughs 2, which are rectangular boxes open at the top but closed at both ends, the upper portions of the ends being removable for a purpose to be described. The inclination of these troughs can be varied by means of the adjusting screws 3, and they may even be brought to a horizontal position, if desired. As the troughs are all alike, it will only be necessary to describe one of them in detail. Along each side of the trough is secured a cleat 4, to which cleats are screwed the edges of the semi-circular, perforated metal screen-plate 5, the apertures in which are of a size to permit the pith cells to pass through.

Running longitudinally of the axis of the screen-plate is the shaft 6, provided with the helicoidal blade 7, forming a screw conveyer of practically the same diameter as the interior of the screen-plate. Said shaft 6 is journaled in the boxes 8, which are made adjustable in the slots in the ends of the trough, by screws 9. Said boxes are split, as shown, and their inner ends are threaded for the reception of collars or washers 10, which close the slots on the inside of the trough.

Two sprocket wheels 11 are secured to the shaft outside the trough, by one of which the shaft is driven and by the other of which it transmits motion to the conveyer in the next trough. The conveyers are alternately of right and left pitch, and convey the long fibers from the lower end of each trough to the higher end thereof.

Running along above the trough is a perforated pipe 15, through which water is supplied. This pipe is supported on the ends of the trough in boxes or rests 16 which can be adjusted along said ends so as to bring said pipe nearer or farther from the center. In practice, the pipe is located to one side of the center, as shown, it being on the side toward which the lower part of the conveyer is turning. Owing to this location of the pipe, the water constantly washes down the fibers and cells which are carried up on the sides of the screen-plates by the blades of the conveyer. The fibers and cells, mixed with water, are introduced into the topmost trough at its lower end through the pipe 17 and are conveyed upwardly along the screen by the conveyer, additional water being constantly supplied through the pipe 15. A large part of the water passes through the screen-plate 5 into the bottom of the trough, taking with it some of the pith cells. Owing, however, to the action of the screw-conveyer, all currents in the water are broken up almost as soon as they start, the consequence of which is that the long fibers are not sucked into the perforations in the screen-plate, but are carried along by the water toward the upper end of the same, where they pass out through the pipe 8, leading from the screen-plate down into the lower end of the next trough below. The water and the pith cells, which passed through the screen-plate, run out of the lower end of the trough into a pipe 19, which communicates with a stand-pipe 20, leading down into tanks 21, 21, in the basement, or below the frame containing the troughs.

Each trough has a similar outlet pipe 19, at its lower end, communicating with the stand-pipe 20. While one of the said tanks is being filled, the contents of the other are allowed to settle, the water being drawn out from time to time through the pipe 22, which, as shown, has a section 23, connected thereto by a universal or knuckle joint 24 and provided with a float 25 near its open end, so as to follow the level of the water. A pump 26 draws the water out of either tank and returns it to the topmost water-supply pipe 15 by a pipe 27.

28 is a fresh water supply pipe, which, together with pipe 27, leads into the vertical pipe 28, to which each pipe 15 is connected through a valve 29 and a short section of hose 30. The collected pith cells are drawn out of the tank from time to time by a stuff-pump (not shown) connected to the pipes 31 near the bottom of the tanks. This method of collecting the pith cells is shown by way of illustration only, it being in many instances possible and even preferable to deliver both the fibers and the pith cells directly to separate wet machines where they are collected and treated in the well-known way, thus doing away with the intermediate steps of collecting the pith-cells in the said tanks and then pumping them out again.

While the separation is thus a progressive one, some of the pith cells being removed in each succeeding trough, it is not necessary to have any particular number of troughs, but, if only a few are used, they must be long enough to furnish the requisite amount of screen surface, but in practice, it is usually most convenient to make the troughs relatively short, say 8 feet, and to provide a number of them arranged above each other, as shown in Fig. 1.

The water carrying the long fibers is drawn off through pipe 32 from the upper end of the lowermost screen-plate and is conveyed by a stuff pump (not shown) to the wet machine, or any other of the usual apparatus.

It will be seen from the above description that the apparatus performs the function of a washer as well as that of a separator. It may, in fact be used as a washer alone, if desired, the pipes leading to the tanks removing the dirt, etc., from the material being washed. Whether used as a washer alone, or as a washer and a separator, the material being treated is kept in constant motion, not being allowed to settle at any time during its passage through the apparatus.

Having thus described my invention, what I claim is—

1. An apparatus for separating the pith cells from the long fibers of certain plants, comprising superimposed receptacles, each containing a foraminous screen-plate, and a screw conveyer rotatably mounted within said screen-plate, pipes to supply water throughout the length of each receptacle, a drain-pipe for the short fibers leading from one end of each receptacle below the screen and a pipe leading from said screen at the opposite end of the receptacle communicating with the next receptacle below.

2. An apparatus of the class described, comprising an inclined receptacle, a perforated metal screen-plate supported in said troughs, a screw conveyer rotatably mounted within said screen-plate, means to vary the inclination of the receptacle, a pipe to convey the mixed fibers and cells to the lower end of the receptacle above the screen plate, a pipe leading from the other end of the screen-plate to convey the fibers away, a pipe leading from the lower end of the receptacle below the screen-plate to convey the cells away and a perforated pipe located above said screen plate and to one side of the receptacle to supply water.

3. An apparatus of the class described, comprising an inclined receptacle, a foraminous screen-plate supported therein, a screw-conveyer within said screen-plate, a perforated pipe above and to one side of the center of said screen-plate to supply water, a pipe leading from the lower end of said receptacle below said screen-plate and a pipe leading from the upper end of said screen-plate.

4. An apparatus of the class described, comprising a frame-work, superimposed oppositely inclined receptacles adjustably supported in said frame-work, foraminous screen-plates, containing screw-conveyers, in said receptacles, a discharge pipe located behind said receptacles and connected to the lower end of each one, a pipe connecting the upper end of each screen-plate with the lower end of the screen-plate in the receptacle below, means to supply water throughout the length of each screen-plate and means to drive said conveyer.

5. An apparatus of the class described, comprising a receptacle, adjustable means supporting the ends thereof so that it may be inclined, a foraminous screen-plate supported within said receptacle, a perforated pipe connected to a source of water-supply and adjustably supported on the ends of said receptacle, a screw-conveyer rotatably supported within said screen-plate, a pipe leading out of the lower end of said receptacle and a pipe leading out of the upper end of said screen-plate.

6. An apparatus of the class described, comprising a frame-work, a plurality of receptacles supported therein and inclined alternately in opposite directions, a foraminous screen-plate and a screw-conveyer in each receptacle, a pipe leading from the upper end of each screen-plate into the lower end of the screen-plate below, a pipe running from the lower end of each receptacle into a collecting tank, a water-supply stand-pipe, a perforated pipe above each receptacle connected to said stand-pipe, means to adjust the position of said perforated pipes transversely to the receptacles and means to return the water from said tank into said stand-pipe.

7. In a pulp screening mechanism, the combination with a plurality of superimposed receptacles, each provided with a rotary screw conveyer and a foraminous screen extending beneath the latter, conduits affording communication between said receptacles, means for supplying a fluid to the latter and means for draining off said fluid.

8. In a pulp screening mechanism, the combination with a plurality of receptacles, each provided with a rotary screw conveyer journaled therein, and a foraminous screen extending beneath the latter and means affording communication between said receptacles.

9. In a pulp screening mechanism, the combination with a plurality of receptacles, of an agitator within each of said receptacles, a foraminous screen extending beneath each of said agitators, and means affording communication between said receptacles.

10. In a pulp screening mechanism, the combination with a plurality of superimposed receptacles each containing a foraminous screen and a screw conveyer rotatably mounted above said screen, means affording communication between said receptacles, and means for maintaining a fluid circulation through said receptacles.

11. In a pulp screening mechanism, the combination with a receptacle, of a rotary screw conveyer journaled therein and limited against longitudinal travel, a foraminous screen extending beneath said conveyer, and means for rotating the latter.

12. In a pulp screening mechanism, the combination with a receptacle, of a rotary conveyer journaled therein, and limited against longitudinal travel, a foraminous screen extending beneath said conveyer, and a conduit mounted above the conveyer and extending longitudinally of the receptacle, said conduit being perforated substantially throughout its length and adapted to supply a cleansing fluid to the conveyer.

13. In a pulp screening mechanism, the combination with a receptacle, of a conveyer journaled therein to rotate about its own axis but limited against longitudinal travel, a parti-circular screen extending beneath said conveyer, inlet and discharge conduits, and means for supplying fluid to said receptacle.

14. A pulp screening mechanism comprising a serially disposed trough-like screening aggregating great length and inclined from the horizontal, agitator mechanism working adjacent the inner screening surfaces and operating to impel the pulp up over the screen incline, and means for supplying liquid to the pulp at different points of its travel over said screening.

15. A pulp screening mechanism comprising serially disposed trough-like screening aggregating great length, agitator mechanism working adjacent the inner screening surfaces and operating to impel the pulp over the screening, and means for supplying liquid to the pulp at different points of its travel over said screening.

In testimony whereof I have affixed my signature in presence of two witnesses.

GEORGE R. SHERWOOD.

Witnesses:
HOWARD A. COOMBS,
PRESCOTT S. TUCKER.